Aug. 21, 1951  H. W. GILBERT  2,565,364
SHEAR GUIDE FOR CUTTING CLOTH
Filed Nov. 30, 1946
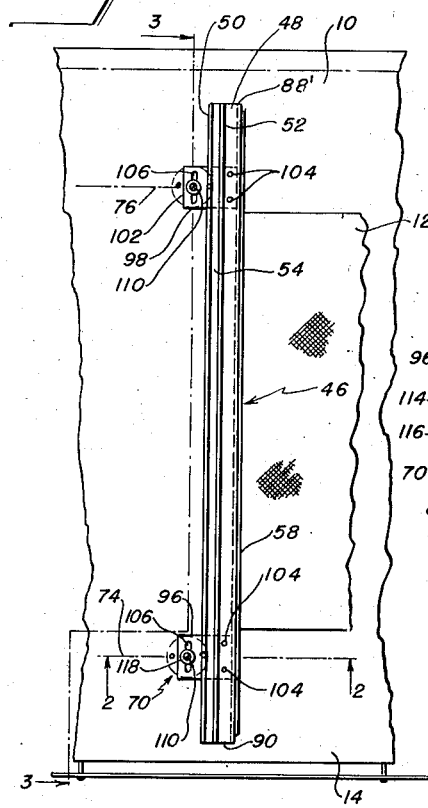
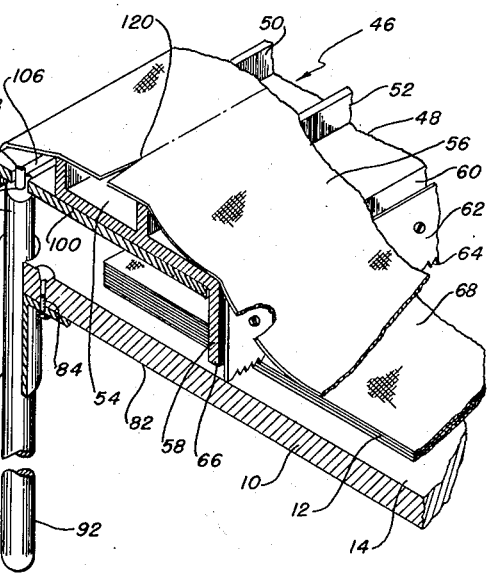
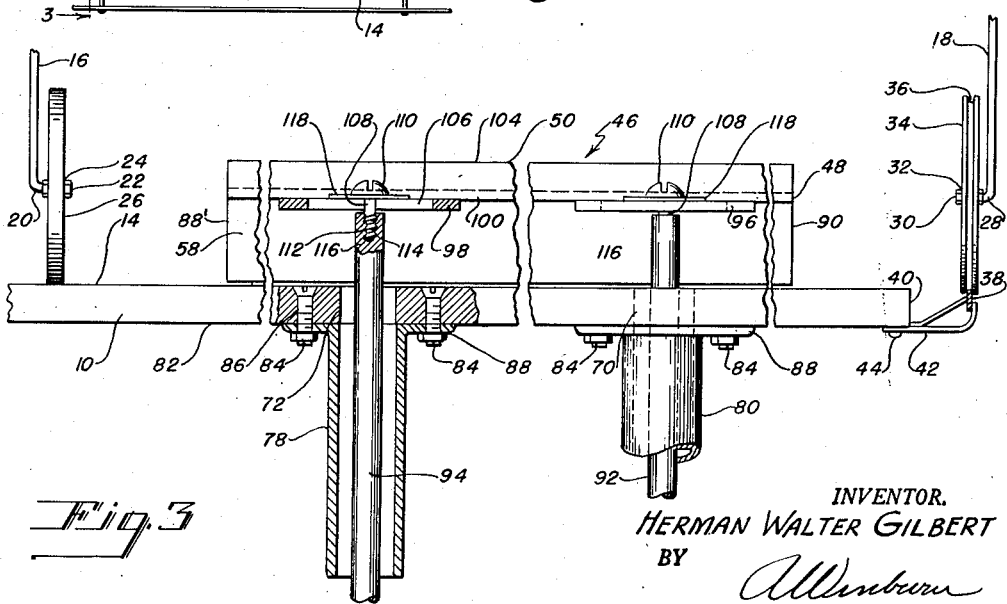
INVENTOR.
HERMAN WALTER GILBERT
BY
ATTORNEY Patented Aug. 21, 1951

2,565,364

UNITED STATES PATENT OFFICE 2,565,364

SHEAR GUIDE FOR CUTTING CLOTH

Herman Walter Gilbert, New York, N. Y., assignor to Cutting Room Appliances Corporation, New York, N. Y., a corporation of New York Application November 30, 1946, Serial No. 713,225

9 Claims. (Cl. 164—79)

1

This invention relates to shear guides for cutting cloth.

An object of the invention is to provide a shear guide which is so proportioned relative to the dimensions of the cutting table and the cloth laying machine as to permit the shear guide to remain on the cutting table at all times without interfering with the operation of the cloth laying machine.

Another object of the invention is to provide a shear guide which is shorter in width than the cloth cutting table, and upon which the shear guide may be permanently mounted to form a part thereof.

A further object of the invention is to provide a combination cutting table, shear guide and cloth laying machine.

Still another object of the invention is to provide a shear guide which may be installed upon a combination cutting table and cloth laying machine without interfering with the operation of either, and yet, which so cooperates with both as to contribute to the improvement of their individual and joint performance of their functions.

Another object of the invention is to provide a means whereby a shear guide may be permanently disposed upon a cutting table, thus obviating the need for employing a separate table or rack for supporting the shear guide when it is not in use as such, and accordingly decreasing the total floor space needed in the cloth cutting room.

Still a further object of the invention is to provide an improved shear guide which is simple in design, inexpensive to manufacture and which is most efficient in operation.

Other objects and advantages of the invention will become apparent from the following description of a preferred embodiment thereof as illustrated in the accompanying drawings, and in which, Fig. 1 is a plan view of my improved cloth cutting device effectively mounted on a table, Fig. 2 is a perspective view, partially in section, of a portion of the device shown in Fig. 1, such as might be seen when viewed along the line 2—2 of that figure, and Fig. 3 is a sectional and elevational view of the device shown in Fig. 1, as might be seen when viewed substantially along the line 3—3 of Fig. 1.

In the employment of cloth cutting tables and of cloth laying machines in connection therewith, it has been of considerable assistance to use shear guides disposed upon the cutting table for accurately cutting the cloth which is layed upon the table by the cloth laying machine. Such a shear guide is described in U. S. Patent to M. Breth No. 2,205,743, issued on June 25, 1940. The present invention covers an improved form of shear guide, which in certain respects is similar to the shear guide described in the aforesaid patent, reference being had to said patent for such details of construction as are not described in detail herein. It will be understood that reference to the foregoing patent is only to be considered as and by way of example illustrative, and not at all in a limiting sense.

For a more complete understanding of the nature of the present invention, and the manner in which it may be carried out, reference may now be had to the drawings, in which like reference characters denote similar parts throughout the several views. As shown, there is a cutting table 10 which is usually supported upon legs, not shown, resting at their lower ends upon the floor of the cutting room, the cutting table being generally horizontal relative to the floor level.

A number of superimposed layers 12 of cloth are shown resting upon the upper surface 14 of the cutting table, the cloth having been unrolled from a bolt of cloth by any suitable means, such as for example from a cloth laying machine, the legs 16 and 18 of which are illustrated in fragment in Fig. 3. The leg 16 has its lower end portion 20 bent into a substantially horizontal plane and shaped in the form of a cylindrical axle 22 which is journaled in the hub 24 of a traction wheel 26. The wheel 26 rests upon the upper surface 14 of the cutting table and rolls along it as the cloth laying machine is moved longitudinally thereof to unroll the cloth thereon.

The other leg 18 also has its lower end portion 28 bent at right angles and shaped in the form of a cylindrical axle 30 which is journaled in the hub 32 of a traction wheel 34. As shown in Fig. 3, the wheel 34 is provided with an outwardly open peripheral groove 36 for the reception of a track 38 which is spaced from the right hand longitudinal edge 40 of the cutting table, as seen in the view, and extends longitudinally of the table and parallel to its edge 40, the track being supported at intervals along its length, upon brackets 42 which are secured to the table by means of bolts 44.

Inasmuch as the cloth laying machine does not in itself comprise the invention, it will not be described in any further detail since the construction of cloth laying machines is now well known in the art. It will be observed that the width of the cutting table is usually greater than that of the layers of cloth being laid thereupon.

In order to facilitate the cutting of the cloth bolt being unrolled at the ends of the layers 12, I provide a shear guide which is illustrated in the drawings. As shown, there is a cross bar 46 which has a horizontal wall 48 and a pair of upwardly extending parallel spaced walls 50 and 52, forming therebetween a groove 54 to receive the ends of a shear blade when cloth 56 is overlying said cross bar. Extending downwardly from the forward end of the horizontal wall 48, is a wall or flange 58. Attached to the outer surface 60 of the depending flange 58 is an elongated, flat, thin plate 62, formed at the bottom edge thereof with blunt saw teeth or serrations 64, projecting below the lower edge 66 of the flange 58, and adapted to rest upon and to grip the top cut layer 68 of the layers of cloth.

The plate 62 terminates short of the ends of the cross bar 46. The cross bar 46 is preferably shorter in length than the width of the table 10 across which it extends, so that its ends are spaced from the side edges of the cutting table, for a purpose hereinafter appearing.

The table 10 is provided with apertures 70 and 72, shown in Figs. 2 and 3, and located in Fig. 1 upon the center lines 74 and 76 respectively. Hollow tubular sleeve guides of brackets 78 and 80 extend downwardly from the apertures 72 and 70 respectively, as best shown in Figs. 2 and 3, the sleeve guides being disposed coaxially with the apertures and supported from the undersurface 82 of the cutting table by means of bolts 84 extending through aligned apertures 86 formed in the cutting table 10 and in the flanges 88 of the tubular sleeves 78 and 80.

There are two such sleeveguide tubes 78 and 80, the guide 78 being disposed near the left end 88' of the cross bar 46 as seen in Fig. 3, and the guide 80 being disposed near the right end 90 of the cross bar, the relative locations of the parts being best seen by reference to the plan view shown in Fig. 1. Upright elongated guide rods or posts 92 and 94, which are formed of metal or other suitable material, extend substantially coaxially through the guide tubes 78 and 80 as illustrated, the outside diameter of the rods 92 and 94 being substantially less than the inside diameters of the guide tubes.

The guide rods extend upwardly above the upper surface of the cutting table 10, and are supported upon extension plates or brackets 96 and 98 respectively, the plates being carried upon the undersurface 100 of the horizontal wall 48 of the cross bar 46 and extending outwardly from the end wall 50 thereof as far as location 102 (see Fig. 1). The extension plates 96 and 98 are securely fastened to the crossbar by means of screws 108 extending through the extension plates and into the bar. The extension plates are provided with lateral elongated slots 106 through which extend the shanks 108 of screws 110, the slots being located between the upstanding wall 50 and the edges 102 of the extension plates.

The lower threaded end portions 112 of the screw shanks engage in correspondingly threaded recesses 114 formed in the upper ends 116 of the guide rods 92 and 94, and the screw heads 110 rest upon apertured washers 118, which in turn are supported upon the upper surfaces of the extension plates 96 and 98.

Due to the relatively large amount of clearance space between the outer surface of each guide rod 92 and 94 and their encircling guide sleeves 80 and 78, it is apparent that the guide rods will not bind within their guide sleeves, even when one end 90 of the cross bar 46 is elevated in advance of the other end 88' so as to tilt the bar out of parallelism with the cutting table top 10. This will frequently occur when, after the two men have cut the cloth along the line 120 in Fig. 2, that is, from opposite ends of the cross bar 46, and then lift up the cutting guide to allow the out end 56 of the cloth to drop down and rest upon the other layers 12.

The shear guide described herein and its cross bar 46 are shorter in length than the width of the cutting table, thus avoiding any interference with the movement of the cloth laying machine. Hence, the improved shear guide may remain upon the cutting table as a permanent fixture, and does not need to be removed each time the cloth laying machine is to run past it, as is the case in prior art shear guides.

The shear guides heretofore employed have not been allowed to remain on the cutting table when the cloth laying machine was used, inasmuch as they were of such construction and arrangement as to obstruct passage of the cloth laying machine. The improved shear guide, as described herein has the distinct advantage of being capable of being allowed to remain upon the cutting table at all times, and being used or not, as desired.

Although I have described a preferred embodiment of my invention in specific terms, it is to be understood that various changes may be made in size, shape, materials and arrangement without departing from the spirit and scope of the invention as claimed.

Having described my invention, what I claim and desire to secure by Letters Patent is:

1. In combination, a table, a cloth laying machine supported on wheeled legs and adapted to be moved along said table with its leg wheels traversing the longitudinal marginal upper surface portions of the table, and a rigid member having a passageway adapted to serve as a guide for hand manipulated shearing means designed to cut cloth layed by the said cloth laying machine, means for maintaining said member in predetermined position on said table, said member being of such size with respect to said table whereby to remain wholly out of the path of said leg wheels, thus permitting operation of the cloth laying machine while said member remains in position on the table.

2. In combination, a cutting table, a cloth laying machine supported on wheeled legs and adapted to be moved along the table top longitudinally thereof for laying layers of cloth thereupon, the leg wheels being carried upon and traversing longitudinal marginal table top portions on each side of said cloth layers, and a shear guide carried on said cutting table and including means for engaging a stack of cloth layers, means on said shear guide for supporting a top cloth layer in position for being cut, means for elevating said shear guide after the said layer has been cut to allow the layer to drop onto the pile therebelow, and guide means for so constraining the upward and downward motion of the shear guide as to enable it to be returned downward to substantially its original position relative to said table, said shear guide being shorter than the marginal edges of the table so that the cloth laying machine will clear the ends of the shear guide.

3. In combination, a cutting table, a cloth laying machine supported by said table and adapted to be moved along over the table top for laying layers of cloth thereupon, said cloth laying machine being so supported on the table as to avoid contact with the table at any point on the table top on which cloth layers are to be disposed thereby, a shear guide shorter in length than the width of said cutting table and carried on said cutting table, means on said shear guide for engaging cut layers of cloth disposed on the table top, means on said shear guide for supporting a layer of cloth being laid upon the table top, cutting slot means on said shear guide for guiding the cutting shears as the said layer is being cut, said cutting table top having apertures formed therein, and guide rods carried by said shear guide and depending therefrom downward into said apertures, whereby the upward and downward motion of the shear guide is so constrained in its path as the shear guide is elevated after the layer has been cut, to allow it to drop onto the pile therebelow, as to enable the shear guide to be returned downward to substantially its original position relative to said table.

4. In combination, a cutting table having a table top, a shear guide carried on the cutting table, a cross bar forming a major body portion of said shear guide, spaced upstanding walls on said cross bar for forming a cutting guide groove therebetween and for supporting a layer of cloth to be cut upon the upper ends of said walls, said cross bar having a depending flange along one edge thereof, serrated means on said flange for engaging cut layers of cloth therebelow, extension plates projecting from the opposite edge of the cross bar and having elongated slots formed therein, said table top having apertures formed therein substantially beneath said elongated slots when the shear guide is in its lowermost position, and guide rods carried by said cross bar and extending upwards through said table top apertures and having means extending into said elongated slots and movable therein, whereby said shear guide may be elevated upon the cutting of a cloth layer to allow the layer to drop onto the pile therebelow, and whereby said shear guide is so constrained and guided in its upward and downward motion as to enable it to be returned downward to substantially its original position relative to said table.

5. The construction of claim 4, characterized further in that said guide rods are suspended in said elongated slots whereby said shear guide may be titled out of a horizontal position while being raised and lowered, without any binding of said guide rods in said table top aperture.

6. The construction of claim 4, characterized further in that said guide rods are suspended in said elongated slots and have an outside diameter substantially less than the inside diameter of said table top apertures, whereby said shear guide may be titled out of a horizontal position while being raised and lowered, without any binding of said guide rods in said table top apertures.

7. The construction of claim 4, characterized further in that said table top apertures are of substantially greater inside diameter than said guide rods and are provided with depending guide sleeves of equal diameter to said apertures, said guide rods being suspended in said elongated slots, whereby said shear guide may be titled out of a horizontal position while being raised and lowered, without any binding of said guide rods in said table top apertures and guide sleeves through which they extend.

8. In combination, a cutting table having a table top, a shear guide carried on said cutting table, means on said shear guide for engaging cut layers of cloth disposed on said table, means on said shear guide for supporting a layer of cloth laid on said table, cutting slot means on said shear guide for guiding the cutting shears as the layer is being cut, said cutting table having apertures formed therein, said apertures being spaced inwardly from opposite longitudinal edges of said table top and guide rods carried by said shear guide and depending therefrom downwardly into said apertures, whereby the upward and downward motion of the shear guide is so constrained in its path as the shear guide is elevated after the layer has been cut, to allow it to drop onto the pile below, as to enable the shear guide to be returned downwardly to substantially its original position relative to said table.

9. The construction according to claim 8 in which said table top apertures are of substantially greater inside diameter than said guide rods and are provided with depending guide sleeves of equal diameter to said apertures, said guide rods being suspended in said elongated slots, whereby said shear guide may be tilted out of a horizontal position while being raised and lowered, without any binding of said guide rods in said table top apertures and guide sleeves through which they extend.

HERMAN WALTER GILBERT.

REFERENCES CITED

The following references are of record in the file of this patent:

UNITED STATES PATENTS

| Number | Name | Date |
|---|---|---|
| 269,867 | Lissner | Jan. 2, 1883 |
| 275,640 | Godshalk | Apr. 10, 1883 |
| 354,952 | Tower | Dec. 28, 1886 |
| 1,942,728 | Perlstein | Jan. 9, 1934 |
| 2,168,752 | Sigmond | Aug. 8, 1939 |
| 2,175,823 | Breth | Oct. 10, 1939 |
| 2,205,743 | Breth | June 25, 1940 |